United States Patent [19]

Carlomagno et al.

[11] Patent Number: 5,007,574
[45] Date of Patent: Apr. 16, 1991

[54] DESOLDERING DEVICE

[75] Inventors: Michael Carlomagno, Redwood City; Hamid Poostpasand; Steven James, both of Mountain View, all of Calif.

[73] Assignee: Metcal, Inc., Menlo Park, Calif.

[21] Appl. No.: 407,115

[22] Filed: Sep. 14, 1989

[51] Int. Cl.[5] .................. B23K 3/04; B23K 3/047
[52] U.S. Cl. ........................... 228/20; 228/21; 228/59; 219/236
[58] Field of Search .................. 228/19, 20 R, 20 HT, 228/21, 52, 59, 191, 164; 219/229, 236, 10.75, 10.79

[56] References Cited

U.S. PATENT DOCUMENTS

| | | | |
|---|---|---|---|
| 3,169,499 | 2/1965 | Armanno | 228/20 HT |
| 3,584,190 | 6/1971 | Marcoux | 219/229 |
| 3,588,618 | 6/1971 | Otte . | |
| 3,690,539 | 9/1972 | Geiger | 219/229 |
| 3,864,014 | 2/1975 | Lynch . | |
| 3,884,409 | 5/1975 | Kaufman | 228/20 HT |
| 3,970,234 | 7/1976 | Litt et al. | 228/20 HT |
| 4,187,972 | 2/1980 | Vella | 228/20 HT |
| 4,289,953 | 9/1981 | Scheu, Jr. | 219/236 |
| 4,574,994 | 3/1986 | Rauchwerger | 228/20 HT |
| 4,695,713 | 9/1987 | Krumme . | |
| 4,701,587 | 10/1987 | Carter et al. | 219/10.75 |
| 4,745,264 | 5/1988 | Carter | 219/10.75 |
| 4,752,673 | 6/1988 | Krumme | 219/229 |
| 4,771,151 | 9/1988 | Pursell . | |
| 4,788,404 | 11/1988 | Kent . | |
| 4,795,870 | 1/1989 | Krumme et al. . | |
| 4,839,501 | 6/1989 | Cowell | 219/229 |

FOREIGN PATENT DOCUMENTS

| | | | |
|---|---|---|---|
| 2105476 | 4/1972 | France | 228/20 HT |
| 6601198 | 8/1966 | Netherlands | 228/20 HT |

Primary Examiner—Sam Heinrich
Attorney, Agent, or Firm—Howard L. Rose

[57] ABSTRACT

A desoldering tool has a removable cartridge and a base unit having an assembly interior including a solder collection chamber and a removable vacuum source for developing a vacuum in the bottom of the chamber under a removable porous solder retention pad, the cartridge having a temperature self-regulating heater therein and a tail pipe extending from a tip of the cartridge to a position above the solder collection chamber, and a vacuum seal between the cartridge and the base unit to maintain the vacuum and reduce transfer of heat from the tip.

20 Claims, 2 Drawing Sheets

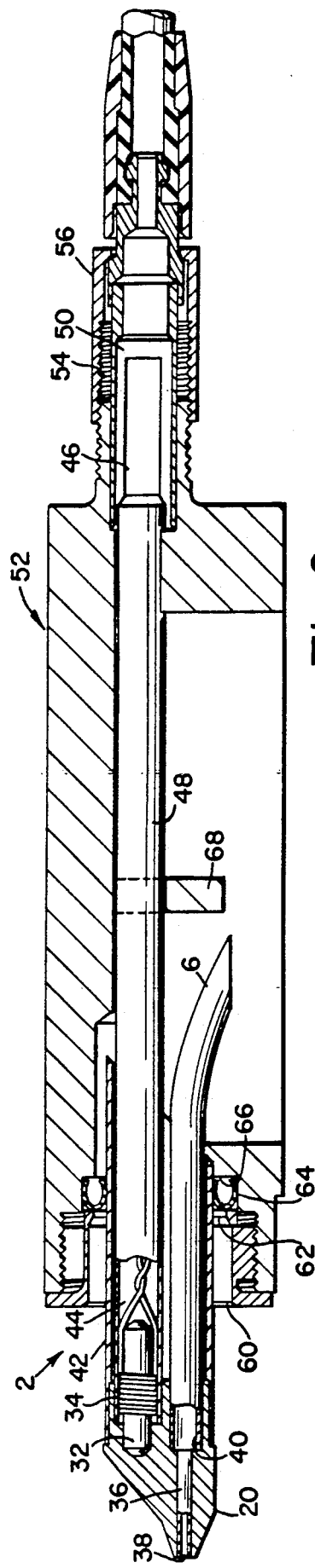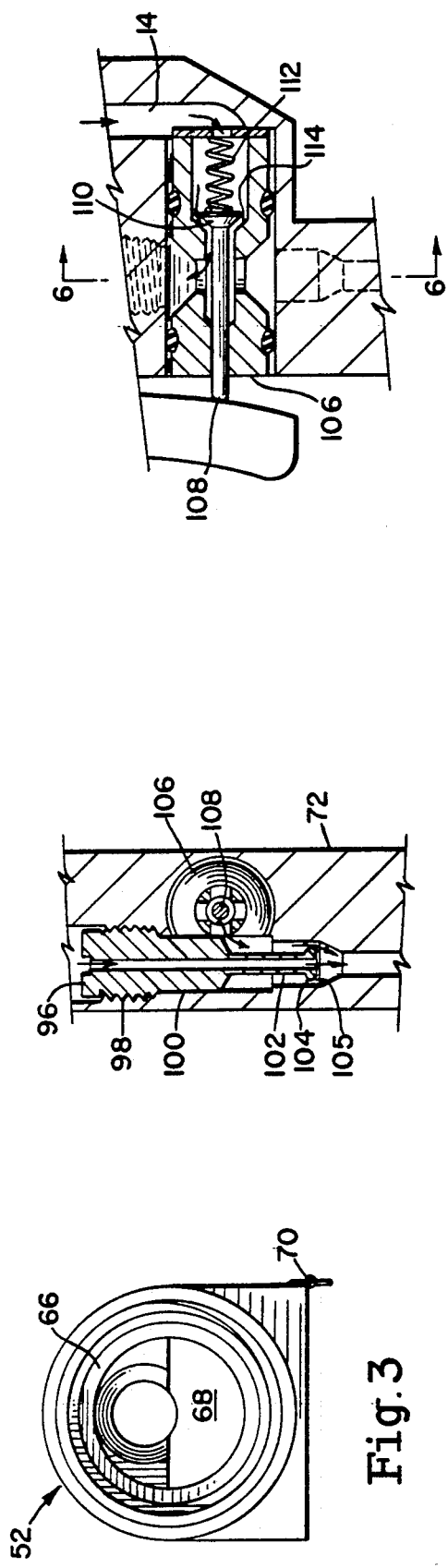

DESOLDERING DEVICE

BACKGROUND OF THE INVENTION

The present invention relates to desoldering equipment and, more particularly, to a desoldering tool employing a solder collection tray with a disposable liner and replacable major components.

Desoldering equipment is employed, among other reasons, to remove electrical components from circuit boards or the like. The prior art has developed numerous different types of desoldering tools which typically include a source of heat, a source of vacuum and a reservoir for solder. These prior art tools suffer from one or more of the following disadvantages: insufficient power or overpower, so that removal of an element from a board is quite difficult, or the board is damaged; the tool becomes hot to the hand of the operator, and often they are cumbersome and awkward to use; and, most importantly, the tools are usually difficult to maintain and remove accumulated solder and resin therefrom. Specifically, flux, resin and solder tend to accumulate inside the tool and reduce collection passage sizes, as well as fouling the collection chamber and vacuum source.

BRIEF DESCRIPTION OF THE PRESENT INVENTION

The present invention provides a desoldering tool having a base unit and replaceable heater cartridge, venturi vacuum source and solder collection tray liner; the heater cartridge being easily slid in and out of the base unit; the cartridge having a rearwardly extending pipe, a tail pipe that is in communication with the tip of the cartridge at the front of the tool and which extends to a position above the solder collection tray; the tip being of copper; a liner of the solder collection tray being removable and porous, with a vacuum being developed in a space under the liner and communicating through the tail pipe to the tip of the tool; the region of and above the tray being sealed relative to ambient so that vacuum is maintained. The heater of the heater cartridge is preferably a temperature self-regulating heater, see U.S. Pat. Nos. 4,256,945 or 4,745,264, or the like, embedded in the copper tip of the cartridge. The passage at the front of the tip is lined with an abrasion resistant solder wettable material.

The top of the tool may be opened to replace the collection tray liner and to clean, replace or repair the vacuum-producing venturi. The cartridge, as it ages and becomes less effective, is simply slid out of the front of the base unit and a new cartridge slid into its place. As indicated above, the venturi and liner may also be replaced so that all functioning parts are replaceable.

OBJECTS OF THE INVENTION

It is an object of the present invention to provide a desoldering tool in which all major components are readily replacable.

It is another object of the present invention to provide a base unit having a solder collection chamber and a heater cartridge, venturi assembly and chamber liner, all of which may be quickly and easily replaced.

Yet another object of the present invention is to provide a desolder tool in which transfer of heat from the source of the heat to the handle of the device is quickly reduced, relative to prior art devices.

Still another object of the present invention is to employ a temperature self-regulating heater employing Curie point control, whereby the temperature of operation may be changed by changing heater cartridges, and the temperature is relatively constant without external controls.

BRIEF DESCRIPTION OF THE DRAWINGS

FIG. 2 is a side view in perspective of the cartridge and the top part of the base unit.

FIG. 3 is an end view of the top part of the base unit.

FIG. 6 is a view illustrating the position of the air control valve relative to the venturi assembly.

FIG. 7 is a cross-section view of the air control valve.

DETAILED DESCRIPTION OF THE INVENTION

Figure 1:
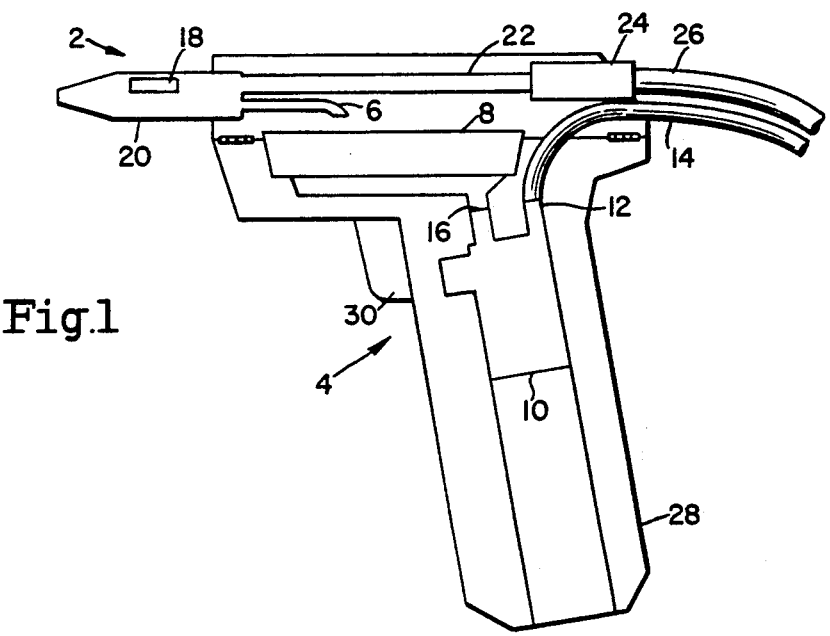
FIG. 1 is an artist's rendition of a side view of the desoldering tool of the present invention.

Referring specifically to FIG. 1 of the accompanying drawings, there is illustrated an artist's rendition of the essential elements of the desoldering tool of the present invention.

Cartridge 2 is disposed in upper member 52 of base unit 4 with tail pipe 6 disposed over solder collection tray 8. Venturi assembly 10 has port 12 connected via tube 14 to a source of pressurized air and a second port 16 at which is developed a vacuum. Port 16 is in communication with the partially open underside of collection tray 8 over which a porous liner is disposed as is illustrated subsequently.

Heater 18 is embedded in copper tip 20 of cartridge 2, and is connected via a coaxial conductor disposed in hollow shaft 22, and slip fit coaxial connector 24 to a further cable 26, and thence to a source of high frequency, constant current if a heater of the prior mentioned patents is used.

Lower member 28 of base unit 4 is fitted with trigger 30 which, when activated, causes a vacuum to be developed below collection tray liner 38.

Referring now specifically to FIGS. 2 and 3 of the accompanying drawings, there is illustrated cartridge 2 and upper member 52 of base unit 4 of the desoldering device of the present invention. Cartridge 2 has, as indicated, tip 20 of copper, in which is embedded heater 18 of FIG. 1, comprising ferromagnetic cylinder 32 surrounded by coil 34. Tip 20 is bored, as at 36, and receives liner 38 in the front end region of the bore; the material of sleeve or liner 38 being fabricated from an abrasion-resistant solder wettable material to prolong the life of tip 20 and provide good thermal contact between tip 20 and solder. Tail pipe 6 is fitted into enlarged bore 40 in the back of tip 20, in communication with bore 36.

Copper tip 20 of cartridge 2 is fitted into tube 42 of a relatively non-heat conductive metal, such as stainless steel, whereby to isolate upper member 52 and base unit 4 from heated tip 20. To complete cartridge 2, coil 34 is connected via wires 44 to male coaxial connector half 46; the wires extending through rigid tube 22 so that upon insertion of cartridge 2 into upper member 52 of base unit 4, coaxial connector half 46 mates with female coaxial connected half 50, mounted at the rear of upper member 52 of base unit 4. Upper member 52 is threaded at 54 to receive threaded collar 56 that engages the right end, as viewed in FIG. 2, of female connector half 50, thus preventing separation of connector halves upon use of the tool.

Cartridge 2 is supported at its front or tip end by sealing ring 64, which is retained by hollow cylindrical insert 60, threaded into the front of the upper member. Sealing ring 64 is disposed between tube 42 and upper chamber 52 to provide an air seal between cartridge 2 and base unit 4.

FIG. 3 is a view of upper member 52, illustrating its rectangular bottom half and semi-circular upper half. Hinge 70 is secured to the right side, as viewed in FIG. 3, at the lower end of the rectangular member. As will become apparent subsequently, when it is desired to enter the interior of the tool, upper chamber 52 of base unit 4 is rotated about hinge 70 and the interior of base unit 4 is expanded.

Figure 5:
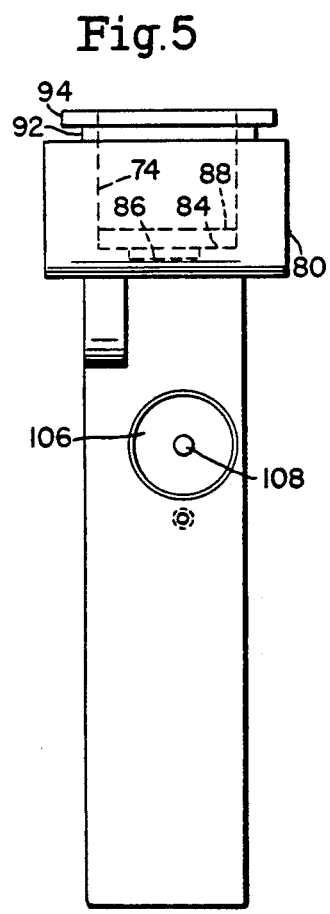
FIG. 5 is a front end view of the bottom part of the base unit.
Figure 4:
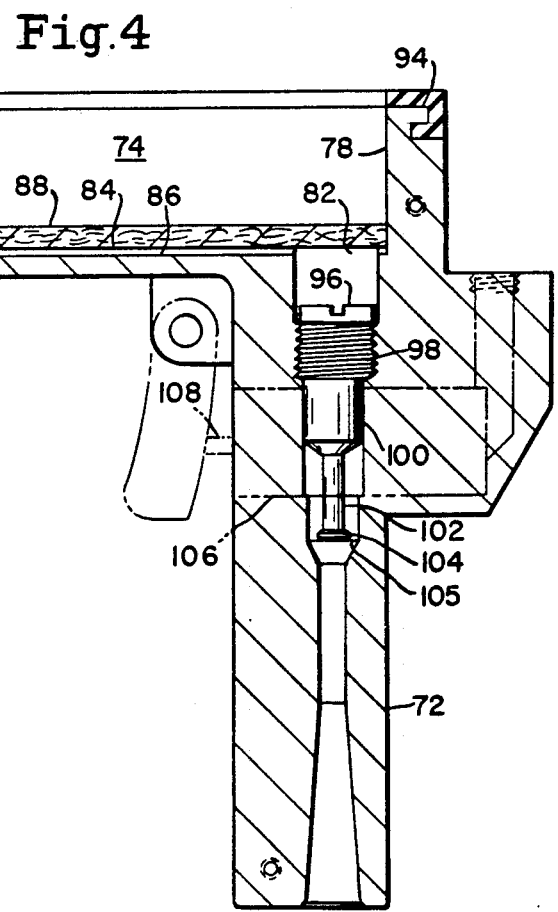
FIG. 4 is a side view in cross-section of the bottom part of the base unit.

Reference is now made to FIGS. 4 and 5 of the accompanying drawings. Base unit 4, exclusive of top member 52, includes member 72 supporting solder collection chamber 8, which extends perpendicular to member 72. Chamber 8 is defined by end walls 76 and 78 and side walls not illustrated in section, but defined by side walls 80 of chamber 8 in FIG. 5. Member 72 has a venturi arrangement for developing a vacuum in bore 82 under chamber 8, a filter being insertable in bore 82 to reduce greatly the quantity of solder, resins, etc. that might otherwise enter the venturi structure. Bottom 84 of chamber 8 is recessed in its middle region, reference numeral 86, to provide direct air access to bore 82. Unrecessed bottom 84 provides support for porous liner 88 that catches and holds the solder.

The upper center edges of walls 80, 76 and 78, are recessed, reference numeral 90, and undercut about the periphery to provide an inwardly extending channel 92 to receive seal 94. Seal 94 serves to provide an airtight seal between lower member 28 of base unit 4 and hinged upper member 52, when the unit is in operation.

Reference is now made to FIGS. 6 and 7 for a description of venturi assembly 10. Member 72, as previously indicated, is provided with vertical bore 95, in which venturi assembly 10 is located. Venturi assembly 10 is screwed into bore 95 in handle 4 from the top as viewed in FIG. 4, and comprises screw head 96 below which is threaded region 98 that engages a corresponding threaded region in bore 95. Hollow cylindrical region 100 extends below the threads, the outer surface of this region engaging the inner wall of bore 95. Below region 100, venturi assembly 10 is tapered inwardly to another hollow cylindrical region 102 of reduced diameter, which terminates in flared skirt 104. Bore 95 tapers inwardly adjacent skirt 104 to provide venturi region 105. Air is introduced into region 105 through air valve 106. Air flows downward through venturi region 105, causing a large reduction in pressure which is transmitted up through hollow venturi assembly 105 to the bottom of solder tray 8.

Valve 106 is a simple push-rod type valve, as illustrated in FIG. 7, comprising rod 108, terminating in outwardly beveled end 110. Rod 108 is biased to the left, as viewed in FIG. 7, by compression spring 112 seated between inwardly tapered walls 114 of valve body 106 and rear wall 116 of valve body 106. Air from air hose 114 is directed to valve 106 via bore 14 in handle 4.

In operation, a power supply, not illustrated, (constant current if one of the heaters of the aforesaid patents is employed) is turned on to heat the tip of cartridge 2 via heater 18. Trigger 30 is squeezed to start air flow, and tip 20 is presented to a region to be desoldered. The melted solder is sucked up into hollow tip 20 and through the downwardly extending tail pipe 6. The solder is dropped onto porous liner 88 in the tray; the solder normally solidifying into pellets before falling on liner 88, thus reducing fouling of the lines and other regions of the device.

Maintenance of the tool is extremely simple and convenient. First of all, the use of liner 88 greatly reduces the amount of cleaning and maintenance required. When liner 88 does become clogged to the extent that suction begins to fall off at tip 20, upper member 52 is released to rotate out of the way, and liner 88 is replaced. If, after extended use, the venturi region becomes affected by solder, resins or the like, venturi assembly 10 is removed from handle 72, cleaned and, if necessary, replaced by a new unit. The part of venturi 10 that is a permanent part of handle 4 may also be cleaned at this time. Cartridge 2 may also be replaced by simply pulling the cartridge out. The tail pipe is maintained clean of solder because it is maintained above solder melt temperature, slopes downwardly, and is made of a chemically inert material such as aluminum.

For cleaning, the tool may be immersed in a solvent bath, since the electrical connection to the power supply is readily removed, and with it, all electrical danger.

Referring back to sleeve 42 and tube 48, both of these elements are made of low thermal conductors, so that there is no contact between high temperature elements and base unit 4 by materials fabricated from a good thermal conductor. In consequence, the tool may be employed for extended periods before it becomes hot enough to be noticeable. In this context, seal 64 also functions as a thermal barrier. Cartridge 2, as designed and illustrated herein, maintains tail pipe 6 which has the front end embedded in copper tip 20 at above solder melt temperatures throughout its length. Also, tail pipe 6 does not touch any part of base unit 4, and thus does not transmit material amounts of heat energy thereto.

The desoldering tool may operate at different temperatures by selections of the Curie temperature of the ferromagnetic material of heater 18. Presently, heaters of 600° F. and 700° F. are prepared, but other temperatures can be provided as desired. Thus, by simply changing cartridges, the tool may be used for various different desoldering functions. Also, of course, depending upon specific functions, cartridges of different physical shapes, particularly that part contacting the solder to be removed, may be employed.

Once given the above disclosure, many other features, modifications and improvements are thus to be considered a part of this invention, the scope of which is to be determined by the following claims.

I claim:
1. A desoldering tool, comprising;
    a base unit having an upper member and a lower member,
    means securing said upper member to said lower member to permit movement of said upper member relative to said lower member to expose the interior of said lower member,
    a solder collection chamber located in said lower member,
    means for developing a partial vacuum below and above said solder collection chamber, a cartridge having a heater and a tip with a bore therethrough, said cartridge disposed in said upper member and having a tail pipe extending from said tip to a position above said solder collection chamber, said tail pipe having a passage extending therethrough and communicating with said bore in said tip, and a heater located at least immediately adjacent said tip.

2. A desoldering tool, as in claim 1, further comprising;

means for removably receiving said cartridge in said base unit.

3. A desoldering tool, as in claim 1, wherein said cartridge comprises;

a tip fabricated from a god heat conductor and having a front end for contacting solder to be removed and a back end, a heater positioned at least partially in said good heat conductor in heat-conducting relationship therewith, a sleeve secured in the bore in said tip and fabricated from a relatively non-corrodible good heat conducting and solder wettable material, said tail pipe fabricated from a good heat conducting material, and a hollow cylindrical tube of low heat conducting material secured to said tip and extending away from the front of said tip.

4. A desoldering tool, as in claim 3, wherein said cartridge further comprises;

wires extending from the back of said tip to one member of a coaxial cable connector, a rigid tube positioned within said first mentioned tube and having said wires located therein and said one member of said coaxial cable connector secured in the end remote from said tip, and a second member of said coaxial cable connector secured in said base unit.

5. A desoldering tool, as in claim 3, wherein said base unit comprises;

a lower member and an upper member hinged to said lower member, means in said upper member for engaging said hollow tube, and means providing an air seal between said upper member and said lower member.

6. A desoldering tool, as in claim 5, wherein;

said cartridge is located in said upper member and a seal is provided between said cartridge and said upper member.

7. A desoldering tool, as in claim 1, further including;

means for supporting a porous member in said solder collection chamber and between the means for developing a vacuum and said tail pipe.

8. A desoldering tool, as in claim 1, wherein said means for developing a vacuum comprises;

an elongated passage in said bottom member, a hollow member located in said passage and extending to a region in communication with the bottom of said chamber, and means developing a vacuum at the end of said hollow member remote from said chamber.

9. A desoldering tool, as in claim 8, wherein;

said hollow member is removable from said passage.

10. A desoldering tool, as in claim 9, comprising;

means for controlling creation of said vacuum.

11. A desoldering tool, as in claim 1, wherein;

said heater is a temperature self-regulating heater having a ferromagnetic material of a defined Curie temperature.

12. A desoldering tool according to claim 11 wherein said heater is inductively heated.

13. A desoldering tool, as in claim 8, wherein;

said solder collection chamber is located between said means developing a vacuum and said tail pipe.

14. A desoldering tool, as in claim 8, wherein;

said means developing a vacuum is a venturi, and means for supplying a gas under pressure to said venturi to produce a vacuum.

15. A desoldering tool, as in claim 14, wherein;

said solder collection chamber is located between said venturi and said tail pipe.

16. A desoldering tool, as in claim 14, wherein;

said tail pipe is disposed over said solder collection chamber and said means for developing a vacuum is located under said solder collection chamber.

17. A desoldering tool, as in claim 1, further comprising;

a hollow tube extending from an end of said cartridge opposite said tip and away from said cartridge, one member of an electrical connector secured in an end of the tube remote from said cartridge, and electrical wires for supplying current to said heater, said wires connected to and extending from said heater through said tube and connected to said one member of said electrical connector.

18. A desoldering tool, as in claim 17, further comprising;

a second member of said connector, said second member secured in said base.

19. A desoldering tool, as in claim 1, wherein;

one end of said tail pipe and said heater are positioned essentially side by side in said tip whereby said tip and said tail pipe are heated to about the same temperature.

20. A desoldering according to claim 1 wherein said upper member and said lower member are essentially coextensive and have mating edges, and sealing means disposed between said mating edges.

* * * * *